United States Patent [19]

Holliday

[11] 3,995,522  
[45] Dec. 7, 1976

[54] PRECISION ALINEMENT APPARATUS FOR CUTTING A WORKPIECE

[75] Inventor: Morriss L. Holliday, Hampton, Va.

[73] Assignee: The United States of America as represented by the United States National Aeronautics and Space Administration, Washington, D.C.

[22] Filed: Oct. 24, 1975

[21] Appl. No.: 625,729

[52] U.S. Cl. .............................. 83/467 R; 83/451  
[51] Int. Cl.² ........................................ B26D 7/16  
[58] Field of Search .................. 83/467, 468, 451

[56] References Cited

UNITED STATES PATENTS

| | | | |
|---|---|---|---|
| 3,198,047 | 8/1965 | Munz | 83/451 |
| 3,368,439 | 2/1968 | Bungay | 83/467 |
| 3,524,372 | 8/1970 | Albrecht | 83/451 |
| 3,695,134 | 10/1972 | Hardwick | 83/451 |
| 3,880,029 | 4/1975 | Bonaddio et al. | 83/467 |

Primary Examiner—Donald R. Schran  
Attorney, Agent, or Firm—Howard J. Osborn; John R. Manning; Gary F. Grafel

[57] ABSTRACT

A fixture is removably affixed to a workpiece thereby providing a temporary reference edge positioned parallel to a reference line and a known distance from a reference point on the workpiece. The temporary reference edge in cooperation with a guide and a cutting blade of a cutting table enables the workpiece to be accurately cut with respect to the reference line and reference point without first having to cut a reference edge on the workpiece.

3 Claims, 2 Drawing Figures

PRECISION ALINEMENT APPARATUS FOR CUTTING A WORKPIECE

ORIGIN OF THE INVENTION

The invention discribed herein was made by an employee of the United States Government and may be manufactured and used by or for the Government for governmental purposes without the payment of any royalties thereon or therefor.

DESCRIPTION OF THE PRIOR ART

In the course of producing many items it becomes necessary to cut a workpiece with respect to a reference line and a reference point on the workpiece without using the workpiece edges as a guide. For example, in the manufacturer of printed circuit boards it is important that the edges of the board be precisely cut with respect to the connector points of the circuit. Since the circuit is normally oriented on the board arbitrarily, the edges of the board can not be used as references. To establish a reference edge on the board it is necessary to measure at least two angles and one linear distance thus defining a reference line. The board must then be cut along the reference line without benefit of a guide. The measuring and cutting of the workpiece in this manner present a high risk of error which often leads to a high rejection rate of the finished product because of unacceptable dimensional variations.

The present invention reduces the rejection rate of the finished product to nearly zero by providing a temporary reference edge which is used to acurately position the workpiece with respect to the cutting plane of a cutting device. While prior developments include positioning a workpiece with respect to the cutting plane of a cutting device, these earlier inventions lack the aspects of the precent invention whereby the workpiece is secured to a fixture thereby providing a temporary reference edge which is at a known distance from a reference point and at a known orientation to a reference line on the workpiece.

U.S. Pat. No. 1,949,262 to Stromely teaches a mechanism for gauging, severing, piling and holding sheet material. However, the sheet material is not provided with a temporary reference edge. Other prior art generally relating to the field of the invention includes: U.S. Pat. No. 2,101,458 to Sachtleben relating to a trimming device for removing the sound portion of photographic sound records; U.S. Pat. No. 2,785,747 teaching a device for alining a plurality of printing matrices having a raised projection; and U.S. Pat. No. 3,229,557 to Kapilow showing an adjustable butt splicer for splicing motion picture film.

It is therefore an object of the present invention to disclose an apparatus for alining a reference line and a reference point on a workpiece with respect to the cutting plane of a cutting device.

An additional object of the present invention is an apparatus whereby an edge of a workpiece can be cut with respect to a reference line on the workpiece without using another edge of the workpiece as a guide.

These and other advantages of the invention will be readily apparent when considered in reference to the description and claims taken in connection with the attached drawings to which they relate.

SUMMARY OF THE INVENTION

In the present invention a fixture is detachably joined to a workpiece such that one edge of the fixture is at a known distance from a reference point and parallel to a reference line on the workpiece. The extended edge of the fixture cooperates with a guide which is at a known distance from a known orientation to the cutting plane of a cutting device. Thus by simply subtracting the distance between the extended edge and the reference point, from the distance between the guide and the cutting line, the distance between the reference line and the cutting line can be determined. It will be readily seen from the following detailed description that the invention will permit the edge of a workpiece to be cut with respect to a reference line and a reference point on the workpiece without using the other edges of the workpiece as reference edges.

BRIEF DESCRIPTION OF THE PREFERRED EMBODIMENT

Figure 1:
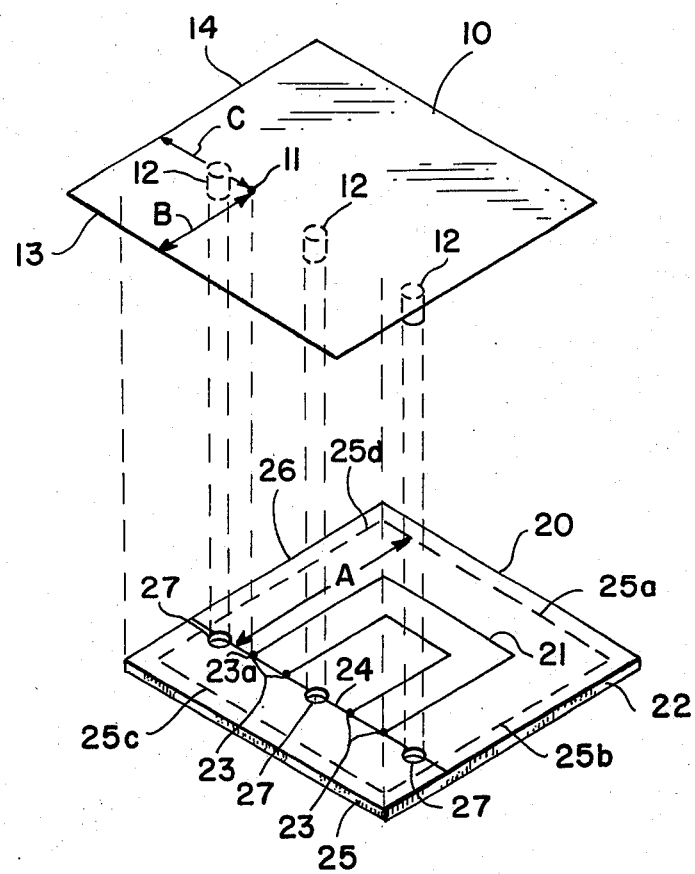
FIG. 1 is a perspective view of the workpiece and the fixture in the preferred embodiment of the invention.
Figure 2:
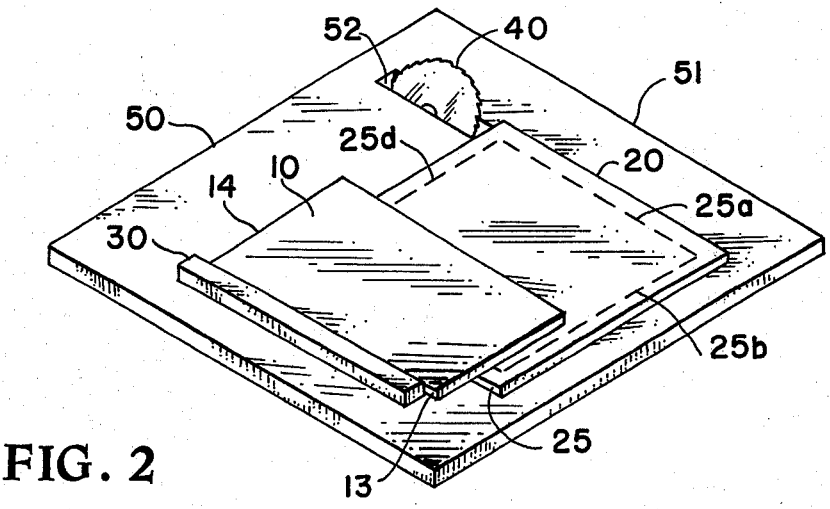
FIG. 2 is a perspective view of the preferred embodiment.

Referring now to the drawings, there is shown a preferred embodiment of the invention as it would be used to cut a workpiece along a line determined with respect to a reference line and a reference point on the workpiece. As seen in the Figures the apparatus comprises basically a fixture 10, a workpiece 20, and a cutting table 50.

The preferred embodiment illustrates an application of the invention using a standard electrical printed circuit board as the workpiece 20 and a cutting table 50 of conventional design to cut the workpiece 20. It should be understood however, that the invention may be advantageously used in the manner to be described with a variety of other workpieces such as photographic prints or the like.

In the preferred embodiment then the cutting table 50 has a flat surface 51 with a slot 52 through which saw blade 40 protrudes. Alinement guide 30 is adjustably affixed to flat surface 51 in such a manner that alinement guide 30 is rotatable and displaceable with respect to the cutting plane of saw blade 40. In addition alinement guide 30 is displaceable along a line parallel to the cutting plane of saw blade 40. Conventionally alinement guide 30 is adjustable through crank and screw arrangements (not shown) although other methods will suggest themselves to one generally skilled in the mechanical arts.

The workpiece 20 comprises an electrical circuit 21 arbitrarily oriented on an oversized board 22 which is to be cut with respect to reference line 24 and first reference point 23a. The electrical circuit 21 has a plurality of connectors 23 through which reference line 24 passes. In other embodiments reference line 24 may be positioned in any suitable location on workpiece 20 as convenience dictates. For example if the workpiece 20 were a photograph arbitrarily oriented on an oversized mounting sheet, any edge of the photograph could serve as reference line 24. Further, while reference line 24 will usually be physically designated on workpiece 20 it may be merely defined by two points.

A plurality of receptacles 27 are located along reference line 24 in the preferred embodiment and may, in other embodiments be located in any suitable position or configuration on workpiece 20. The first reference point 23a is designated at a convenient location on board 22 and serves as the point from which the linear distances to lines 25a, 25b, 25c, and 25d are measured. Lines 25a, 25b, 25c, and 25d are the lines along which board 22 will be cut and do not physically appear on workpiece 20. Rather they are defined with respect to reference line 24 and reference point 23a and are positioned to coincide with the cutting plane of saw blade 40 in a manner to be described below. In the preferred embodiment the distances from connectors 23 to the edges of board 22 must be within close tolerances, therefore first reference point 23a is chosen to coincide with one of the connectors 23 for convenience.

Fixture 10 may be manufactured from a sheet of any suitable material which is rigid and capable of being accurately shaped, such as aluminum or tin. Fixture 10 has a first reference edge 13 and a second reference edge 14 which in the preferred embodiment are orthogonal although any other intersection angle which is accurately known may be used. A second reference point 11 is located on the fixture such that the distances B and C from second reference point 11 to reference edges 13 and 14, respectively, are accurately known. Further, the distances from reference point 11 to reference edges 13 and 14 must be large enough to extend beyond ends 25 and 26 of workpiece 20. A plurality of projections 12 are fastened to fixture 10 such that they register with receptacles 27 of workpiece 20 in a manner such that first reference point 23a coincides with second reference point 11 and first and second reference edges 13 and 14 are respectively parallel and perpendicular to reference line 24.

OPERATION

In operation raised projections 12 are inserted into receptacles 27 thereby removably joining fixture 10 to workpiece 20. When joined in this manner first and second reference points 23a and 11 coincide and first and second reference edges 13 and 14 extend respectively beyond edges 25 and 26 of workpiece 20. Further, first reference edge 13 is parallel to and second reference edge 14 is perpendicular to reference line 24.

In order to cut workpiece 20, first reference edge 13 is placed against alinement guide 30. Alinement guide 30 is then rotated to the desired orientation with respect to the cutting plane of cutting blade 40 which in the preferred embodiment is a parallel orientation. The alinement guide 30 is then positioned at a distance from the cutting blade equal to the distance from second reference point 11 to second reference edge 13 plus the distance from first reference point 23a to line 25a (i.e. the sum of distances A and B). This procedure alines workpiece 20 such that line 25a coincides with the cutting plane of blade 40. Alinement guide 30 and workpiece 20 are then displaced parallel to the cutting plane of blade to thereby cutting workpiece 20 along line 25a. The procedure is repeated with second reference edge 14 against alinement guide 30 to cut line 25b. The fixture 10 is then removed and lines 25c and 25d cut by respectively placing the already cut lines 25a and 25b against the guide 30.

What is claimed as new and desired to be secured by Patent Letters of the United States is:

1. A precision cutting apparatus for accurately cutting a workpiece along a designated line which is a known distance from a reference point and at a known orientation to a reference line on the workpiece comprising in combination:

a workpiece having a reference line, a first reference point, and a designated line; said designated line being selectively positioned at a known angle with respect to said reference line and at a known distance from said first reference point;

a fixture means for providing said workpiece with a temporary reference edge; said fixture means having a reference edge and a second reference point which is a precisely known distance from said reference edge said fixture means being removably affixed to said workpiece such that said reference edge is parallel to said reference line and said first and second reference points coincide; said reference edge extending beyond said workpiece;

a cutting means for cutting said workpiece along said designated line; said cutting means having a blade means for cutting said workpiece fixably positioned to cut in a cutting plane perpendicular to said workpiece; said cutting means also having an alinement means for providing a base line selectively positionable with respect to said cutting plane and displaceable along a line which is parallel to said cutting plane; said line being selectively displaceable with respect to said cutting plane; said alinement means being oriented with respect to said cutting plane at an angle equal to said known angle between said reference line and said designated line and being positioned from said cutting plane a distance equal to the sum of said precisely known distance between said reference edge and said second reference point and said known distance between said first reference point and said designated line; said reference edge cooperating with said adjustable alinement guide to thereby position said designated line parallel to and coincident with said cutting plane so that when said alinement guide is displaced along said line said blade means cuts said workpiece along said designated line.

2. A precision cutting apparatus as in claim 1 wherein said workpiece has a first securing means and said fixture means has a second securing means; said first and second securing means cooperating to removably affix said fixture means to said workpiece.

3. A precision cutting apparatus as in claim 2 wherein said second securing means comprises a plurality of raised projections and said first securing means comprises a plurality of receptacles for receiving said raised projections.

* * * * *